US006237859B1

(12) United States Patent
Hill

(10) Patent No.: US 6,237,859 B1
(45) Date of Patent: May 29, 2001

(54) FLUID INJECTION SPRAY SYSTEM FOR A WIND MACHINE

(75) Inventor: Daryl G. Hill, Yakima, WA (US)

(73) Assignee: Orchard-Rite Ltd., Inc., Yakima, WA (US)

(*) Notice: Subject to any disclaimer, the term of this patent is extended or adjusted under 35 U.S.C. 154(b) by 0 days.

(21) Appl. No.: 09/396,102

(22) Filed: Sep. 14, 1999

(51) Int. Cl.$^7$ .................................................. B05B 9/06
(52) U.S. Cl. ................................................ 239/77; 239/550
(58) Field of Search .............................. 239/77, 78, 224, 239/227, 263.1, 263.3, 548, 550; 47/2

(56) References Cited

U.S. PATENT DOCUMENTS

| | | | |
|---|---|---|---|
| 1,993,635 | 3/1935 | Towt | 47/2 |
| 2,238,120 | 4/1941 | Launder | 261/30 |
| 2,512,782 | * 6/1950 | Strickland | 239/77 |
| 3,067,541 | 12/1962 | Smith | 47/2 |
| 3,123,304 | 3/1964 | Sutton | 239/77 |
| 3,296,739 | 1/1967 | Wiegel | 47/2 |
| 3,944,139 | * 3/1976 | Butler | 239/77 |
| 4,643,355 | 2/1987 | Sanders | 239/2.1 |
| 5,082,177 | 1/1992 | Hill et al. | 239/77 |
| 5,222,665 | 6/1993 | Hill | 239/77 |
| 5,305,548 | 4/1994 | Siebol | 47/2 |

* cited by examiner

Primary Examiner—Lisa Ann Douglas
(74) Attorney, Agent, or Firm—Stratton Ballew PLLC

(57) ABSTRACT

A system for injecting a fluid spray into a wind machine-generated airstream is provided. The system includes a wind machine that is rotatably mounted upon a central tower. The wind machine is a conventional type, generating the air stream by the rotation of a propeller. The air stream can be directed toward a target, such as an orchard, vineyard or crop for cooling, humidifying, heating or the dispersal of agricultural chemicals. The present invention can be utilized for dust control. A nozzle array is mounted proximate to and preferably onto the wind machine, downstream of the air flow. The nozzle array includes at least a nozzle wand with a base end and a nozzle end. The base end attaches to the wind machine and each nozzle end has a nozzle. The nozzle injects the fluid into the air stream, behind and away from the rear of the wind machine. A rotatable manifold distributes the fluid to the nozzle array through the fluid outlet. The manifold is ring shaped and circumferentially mounted on the central tower.

20 Claims, 7 Drawing Sheets

FLUID INJECTION SPRAY SYSTEM FOR A WIND MACHINE

TECHNICAL FIELD

The invention relates to a system for injecting a fluid spray into an air stream and more particularly to an apparatus for atomizing a fluid into an air stream generated by a wind machine.

BACKGROUND OF THE INVENTION

Conventional wind machines are used primarily to prevent springtime frost damage to crops. These conventional wind machines can also introduce water into their wind stream to prevent heat and sun damage to crops in the late summer and early fall.

Prior wind machine devices with liquid dispersion features include U.S. Pat. No. 1,993,635, which disperses water through the hub of the wind machine's propeller to prevent frosting and sunburning. Water is carried up the tower of the wind machine within a stationary water pipe, which is connected to the propeller hub. Additionally, a perforated pipe, filled with a dust material, circles the tower. The perforated pipe delivers the dust material to the lower edge of the rotating propeller for dispersal into the wind stream.

Another liquid dispersing wind machine is found in U.S. Pat. No. 2,238,120, which discloses a spraying device having a manifold attached to the propeller's guard. The guard is circular and the nozzles are positioned on the manifold across the face of the rotating propeller.

U.S. Pat. No. 3,067,541 shows an air circulating apparatus in which water or other treatment fluid, is disbursed by a pair of rotor blades. The blades receive the fluid through a conduit where it is disbursed through discharge orifices on the blades. The blades are mounted on an axis of rotation that is substantially perpendicular to the ground surface. The blades are then turned in a plane that is horizontal to the ground surface.

U.S. Pat. No. 3,296,739 also discloses a rotating orchard heater. A liquid, such as water or fuel is supplied to nozzles mounted on a circular fan guard. A manifold is positioned along the circumference of the fan guard to deliver the liquid to the nozzles at the circumference of the fan guard.

It is desirable, however, to introduce fluids into the wind machine's airstream downstream of the propeller blades. Nozzles mounted on the fan guard, proximate the outer surface of the propeller, can only serve when the propellers draw the air stream past the wind machine and push the air stream, past the nozzles and away from the wind machine. If the flow is reversed, the fluid from the nozzles would be sucked into the propeller, rather than away from it. The fluid, injected from the nozzles mounted to the outer fan guard, coats the propeller and the wind machine. This reverse flow alternative is undesirable. Even if the fluid is only water, it can quickly damage the wind machine, invading the bearings and gears. Additionally, the wind machine's efficiency is reduced because significant amounts of the fluid are lost by coating the propeller and the wind machine, or at least deflected away from the intended target. If the wind machine is operating in freezing conditions, the atomized fluid drawn through the propeller can freeze on the propeller, creating a hazard that can quickly result in damage to the wind machine, and potential injury to persons or objects near the wind machine. Therefore, the fluid must be injected into the airstream at the pressurized, downstream side of the propeller, rather than the upstream, suction side and preferably well clear from potential contact with the wind machine.

U.S. Pat. No. 3,944,139 addressed this problem by disclosing a wind machine having a nozzle-bearing circular manifold that rings around the tower and is mounted just below a rotatable fan. A cam attached to the fan's housing sequentially activates valves on the nozzles as the housing rotates. The fluid stream substantially avoids the wind machine and is injected into the pressurized side of the propeller. However, as shown in FIG. 1 therein, the injected moisture fails to reach the upper portions of the pressurized air stream.

U.S. Pat. No. 5,082,177, by the inventor of the present invention also discloses a ring-shaped manifold for distributing a fluid to nozzles positioned about a wind machine tower. The nozzles are positioned in an array circumferentially about the tower, below the wind machine. The array of nozzles injects the fluid into the wind stream from vertical risers mounted on the tower ringing manifold The risers follow along the tower and are attached to the tower at regular intervals. This array of nozzles injects the fluid to the lower half of the rotor, or propeller of the wind machine.

U.S. Pat. No. 5,222,665, also by the inventor of the present invention, includes a circumferential array of nozzles connected to a manifold that rings the tower proximate the wind machine. The '665 apparatus better distributes the fluid to the entire wind stream as compared with prior devices. However, there are portions of the wind stream, especially in the region directly above the wind machine, which receive less of the injected fluid. A wind machine fluid injection system is needed that more evenly disperses the fluid to the entire generated wind stream.

SUMMARY OF INVENTION

The present invention provides an apparatus for injecting a fluid spray into a wind machine generated air stream. The apparatus includes a wind machine that is rotatably mounted upon a central tower. The wind machine is a conventional type, generating the air stream by the rotation of a propeller. The air stream can be directed toward a target such as an orchard, vineyard or crop for cooling, humidifying, heating, or for the dispersal of agricultural chemicals.

As an alternative, the present invention can be utilized for dust control. For dust control, the target of the air stream is preferably a pile of material or alternatively an industrial process that is generating dust.

According to an aspect of the invention, a nozzle array is mounted proximate and preferably on the wind machine. The nozzle array includes at least a nozzle wand. The nozzle wand has a base end and a nozzle end. The base end attaches to the wind machine and each nozzle end has a nozzle. The nozzle injects the fluid into the air stream.

According to another aspect of the invention, a manifold mounts on the central tower, proximate the wind machine. The manifold has an inner ring and an outer ring. The inner ring fixedly mounts to the central tower and includes a fluid inlet. The outer ring circumferentially mounts to the inner ring. The outer ring includes a fluid outlet and is rotatable relative to the inner ring. The manifold receives the fluid through the fluid inlet and distributes the fluid to the nozzle array, through the fluid outlet.

According to yet another aspect of the invention, the outer ring is cooperatively rotatable about the wind machine with respect to the central tower and is maintained in a synchronous position with respect to the wind machine.

The present invention has the advantage of providing a fluid injection system for a wind machine that evenly disperses the injected fluid to the entire generated wind stream. Still further aspects and advantages of the invention will become apparent from consideration of the following figures and description.

DETAILED DESCRIPTION OF SPECIFIC EMBODIMENTS

Figure 1:
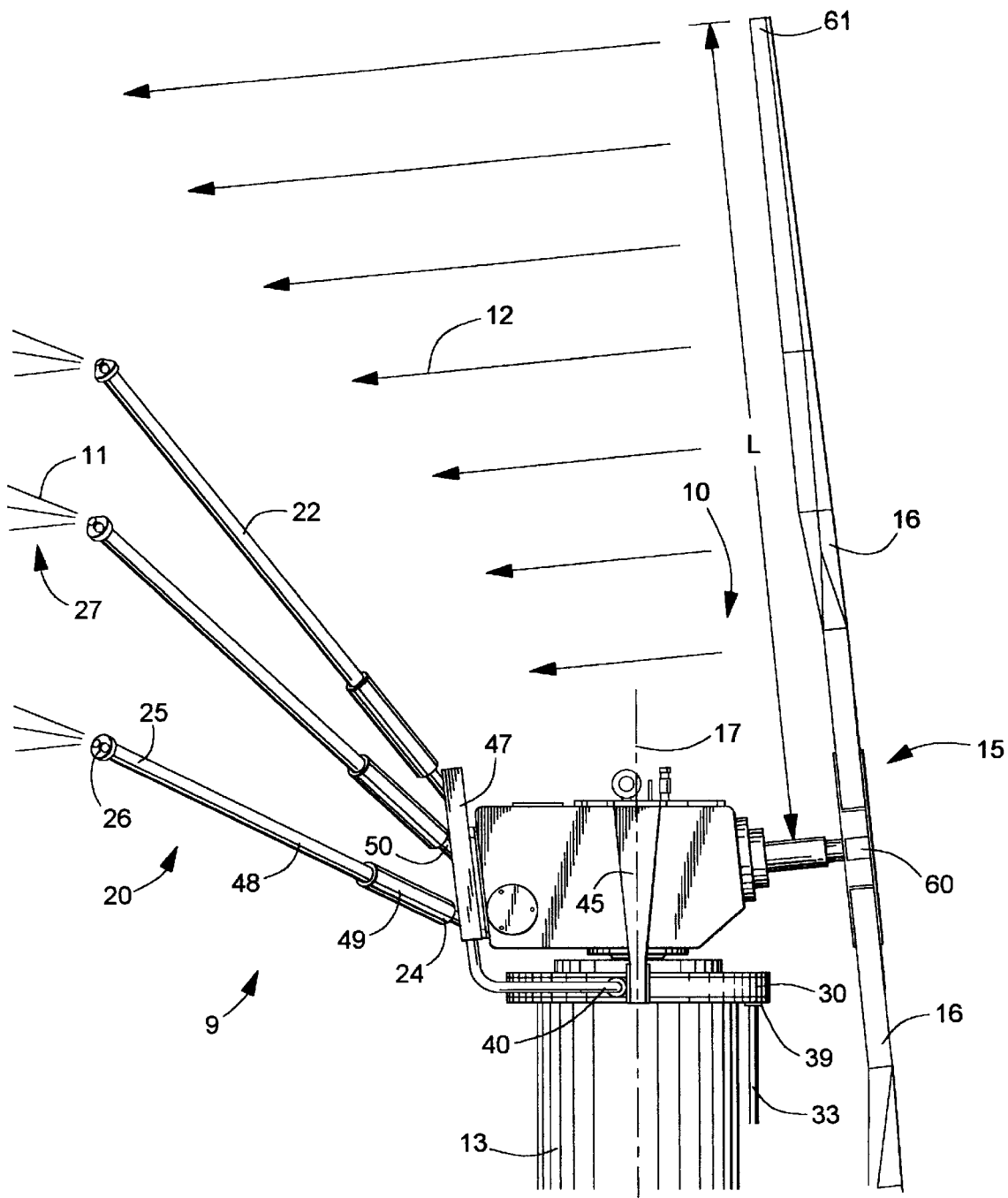
FIG. 1 is a side view of a fluid injection spray system for a wind machine, according to an embodiment of the invention.
Figure 2:
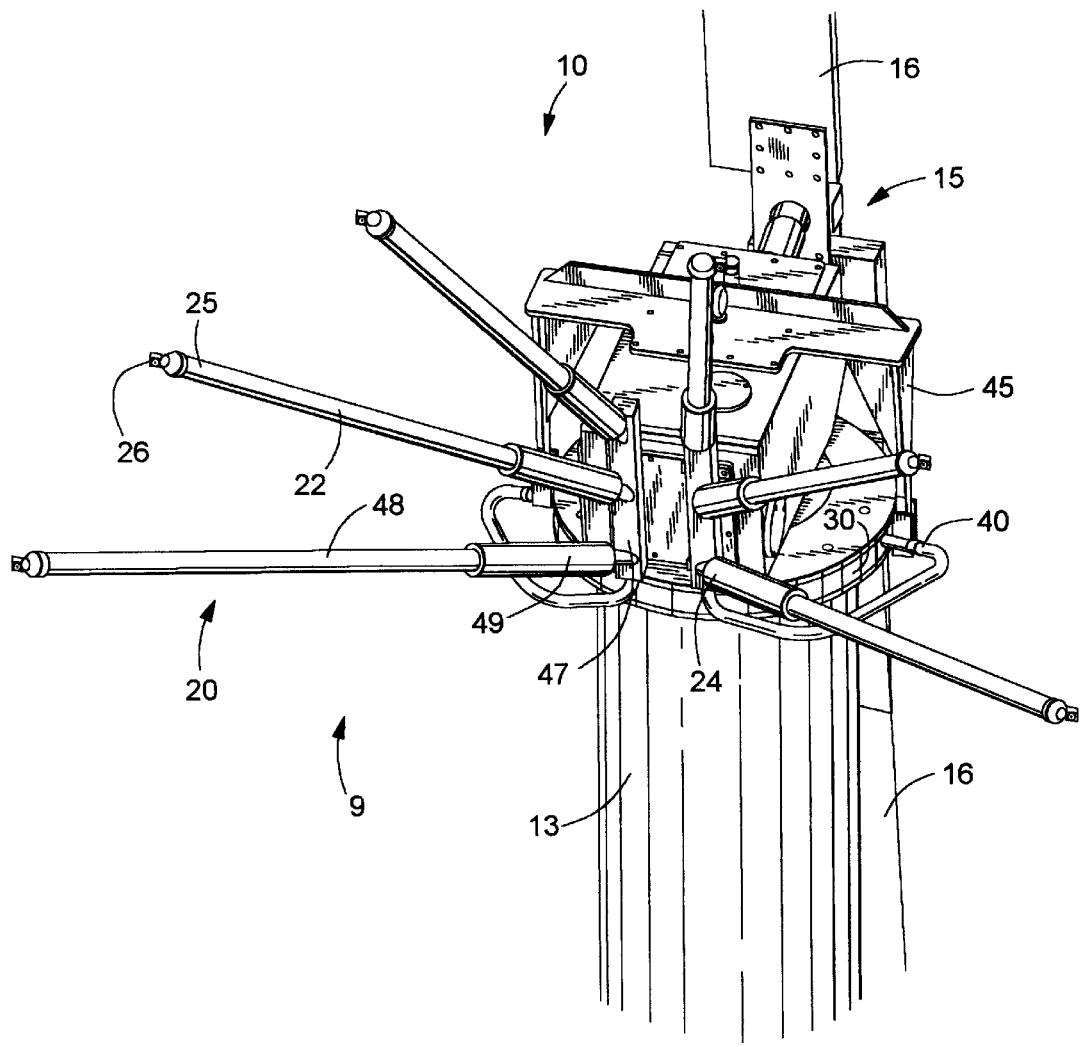
FIG. 2 is a perspective view of a fluid injection spray system for a wind machine, according to an embodiment of the invention.
Figure 3:
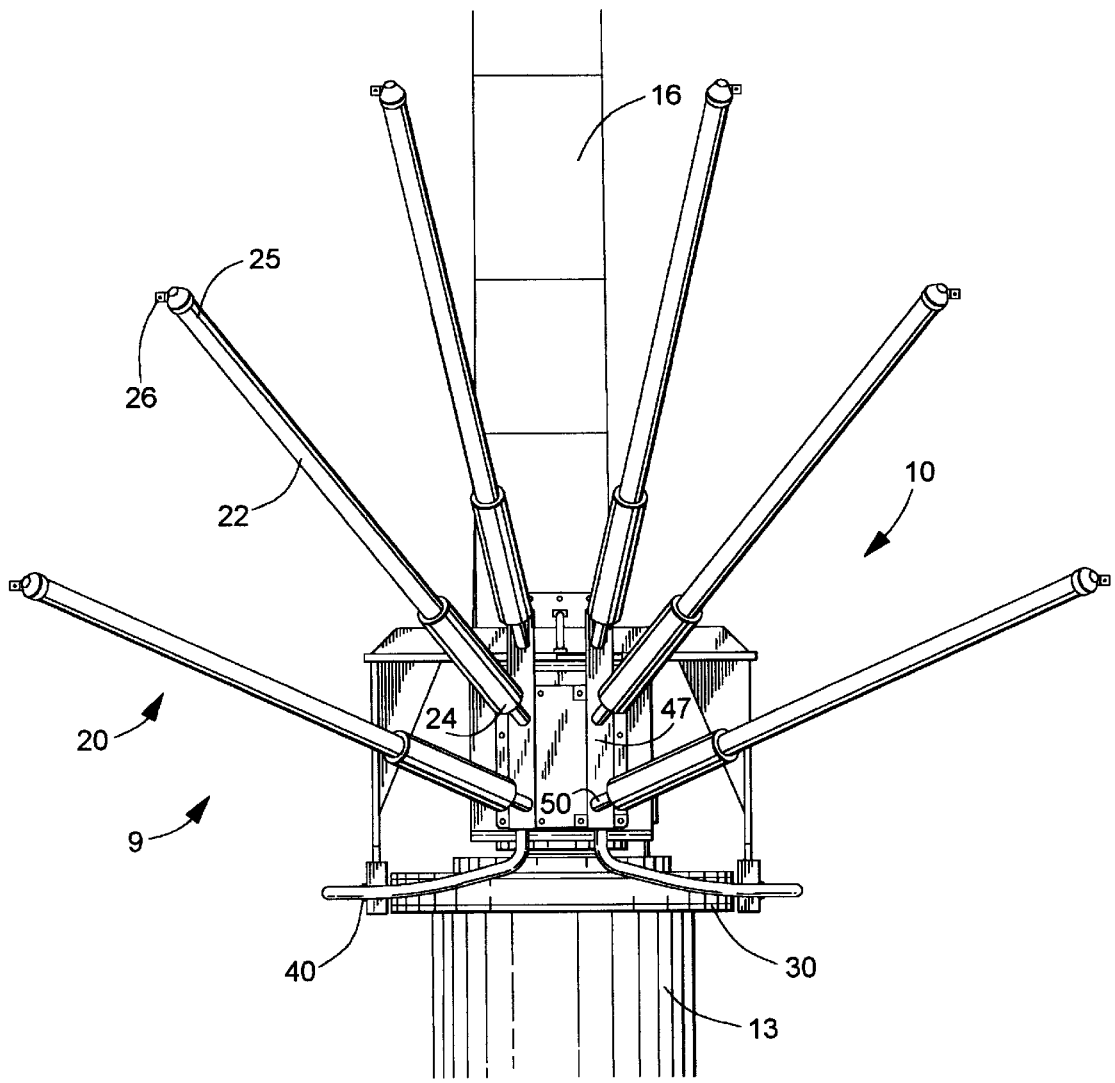
FIG. 3 is a rear perspective view of a fluid injection spray system for a wind machine, according to an embodiment of the invention.

The present invention is embodied in an apparatus as shown in FIGS. 1 through 7. The invention provides a fluid injection system 9 for a wind machine 10 that evenly disperses a fluid 11 into a generated wind stream 12. As FIG. 1 details, the present invention serves a wind machine 10 that is rotatably mounted upon a central tower 13.

The wind machine 10 is a conventional type, generating the wind stream 12 by the rotation of a propeller 15. The propeller preferably has two blades 16, mounted opposed to each other. However three, four or more blades can be alternatively employed. The wind machine is preferably rotatable about the vertical axis 17 of the central tower 13. The wind stream can also be referred to as an air stream and can be selectably directed in a radius of 360 degrees about the central tower, by the rotation of the wind machine on the central tower.

The fluid injection system 9 of the present invention includes a nozzle array 20 for injecting the fluid 11 into the wind stream. The nozzle array is mounted proximate to and preferably onto the wind machine 10 and most preferably onto a rearward portion of the wind machine, as shown in FIG. 1. The nozzle array includes at least a nozzle wand 22, but preferably a multiple of the nozzle wands. Each nozzle wand has a base end 24 and includes at least a single nozzle end 25. The base end attaches proximately to the wind machine, and most preferably directly to the wind machine as shown in FIG. 1. Each nozzle end, which is the tip of the nozzle wand, has a nozzle 26.

Most preferably, as shown in FIGS. 2 through 4, the nozzle array 20 includes six of the nozzle wands 22. Each nozzle wand receives the fluid proximate the base end and conducts the fluid to the nozzle end 25. Alternatively, each nozzle wand could include a plurality of nozzle ends, each with a nozzle 26. Also, alternatively, other multiples of nozzle wands can be employed, preferably within the range of 3 to 10 nozzle wands to adequately distribute the fluid 11 into the air stream 12.

Each nozzle wand 22 is connected to a manifold 30. The manifold receives the fluid 11 from a supply pipe 33 that conducts the fluid up the central tower 13. Preferably the fluid is pumped up the supply pipe at a pressure suitable to disperse the fluid as it is injected from the nozzles 26. Each nozzle injects the fluid into the air stream. Most preferably, the nozzles are conventional spray nozzles that are typically employed for agricultural type spraying.

As shown in FIG. 1, the manifold 30 is mounted on the central tower 13, proximate to and beneath the wind machine 10. As detailed in FIG. 7, the manifold has an inner ring 36 and an outer ring 37. The inner ring fixedly mounts to and completely encircles the central tower. The inner ring includes a ring channel 38 that receives the fluid 11 from a fluid inlet 39. The fluid inlet attaches to the supply pipe 33, which can be located on the exterior of the central tower, as preferred, or alternatively in the interior of the central tower.

The outer ring 37 is circumferentially mounted on the inner ring 36. The outer ring includes a fluid outlet 40 that is connected to the nozzle wands 22. The outer ring is rotatable relative to the fixed, inner ring. A manifold O-ring 41 is preferably included between the inner ring and the outer ring to minimize leakage at their interface. To maintain the fluid outlet in a synchronous position relative to the rotatable wind machine 10, a ring bracket 45 preferably connects the wind machine to the outer ring. The ring bracket slidably rotates the outer ring as the wind machine rotates on the central tower 13. This cooperative rotation of the outer ring to the wind machine maintains the fluid outlet in position relative to the nozzle array 20.

The manifold 30 receives the fluid 11 from the supply pipe 33 through the fluid inlet 39, the ring channel 38 in the inner ring 36 is filled and pressurized. The fluid then exits through the fluid outlet in the outer ring 37 to the nozzle array 20. Each of the multiple of the nozzle wands 22 conducts the fluid from the manifold 30 to the nozzle 26 at the nozzle end 25 or tip end of the nozzle wand.

A preferred alternative to individually piping each nozzle wand 22 from the manifold 30, the nozzle array 20 preferably can include a sub-manifold 47. Most preferably, as shown in FIGS. 2 and 3, two sub-manifolds are utilized. Each sub-manifold is piped to one of the fluid outlets 40 from the manifold and then distributes the fluid to each of the nozzle wands.

As detailed in FIG. 5, the base end 24 of each nozzle wand 22 is mounted to one of the sub-manifolds 47. To provide the nozzle wand with some flexibility, the nozzle wand is preferably a composite structure that includes a flexible, upper wand 48 and a relatively stiffer, lower wand 49. The upper wand is preferably manufactured from a flexible tube and most preferably a length of PVC or fiberglass piping. The lower wand is preferably manufactured from a light metal alloy or a plastic material, and most preferably milled from a block or cylinder of a plastic resin material. To attach the lower wand to the sub-manifolds, the lower wand is preferably received onto a sub-manifold extension tube 50. The sub-manifold extension tube is preferably a metal tube of substantially the same material as the sub-manifold, most preferably aluminum or a stainless alloy. The sub-manifold extension tube is received into the lower wand in a gasketed connection and preferably welded to the sub-manifold.

The composite construction of the nozzle wand 22 provides a forgiving, yet substantially rigid conduit of the fluid 11. The nozzle wand must withstand the pressure from the impacting wind stream 12, yet can flex if impacted. Impacts to the nozzle wand can conceivably occur for a variety of reasons. Debris from storms, freezing liquids 11 dislodged from clogged nozzles 22 or other wind machines, or other materials inadvertently drawn through the wind machine 10 can strike the nozzle wand and cause damage if it is inflexible.

The fluid 11 is conducted from the sub-manifold through each nozzle wand 22 to the nozzle 26 that is attached to the nozzle end 25. The nozzles are preferably directed to inject the fluid into the air stream 12 as shown in FIGS. 1 through 5. The fluid is injected from the nozzles in a spray pattern 27, as shown in FIG. 1. This spray pattern can be varied by the selection of the nozzle. The spray pattern is preferably selected to avoid impact of the fluid injected into the airstream from any particular nozzle from impacting the fluid injected into the air stream from any other nozzle. By minimizing overlap of the spray patterns, the fluid is better atomized and fully evaporates into the airstream, thereby increasing the cooling effect of the fluid and minimizing residue and spotting on the targeted crops.

Figure 6:
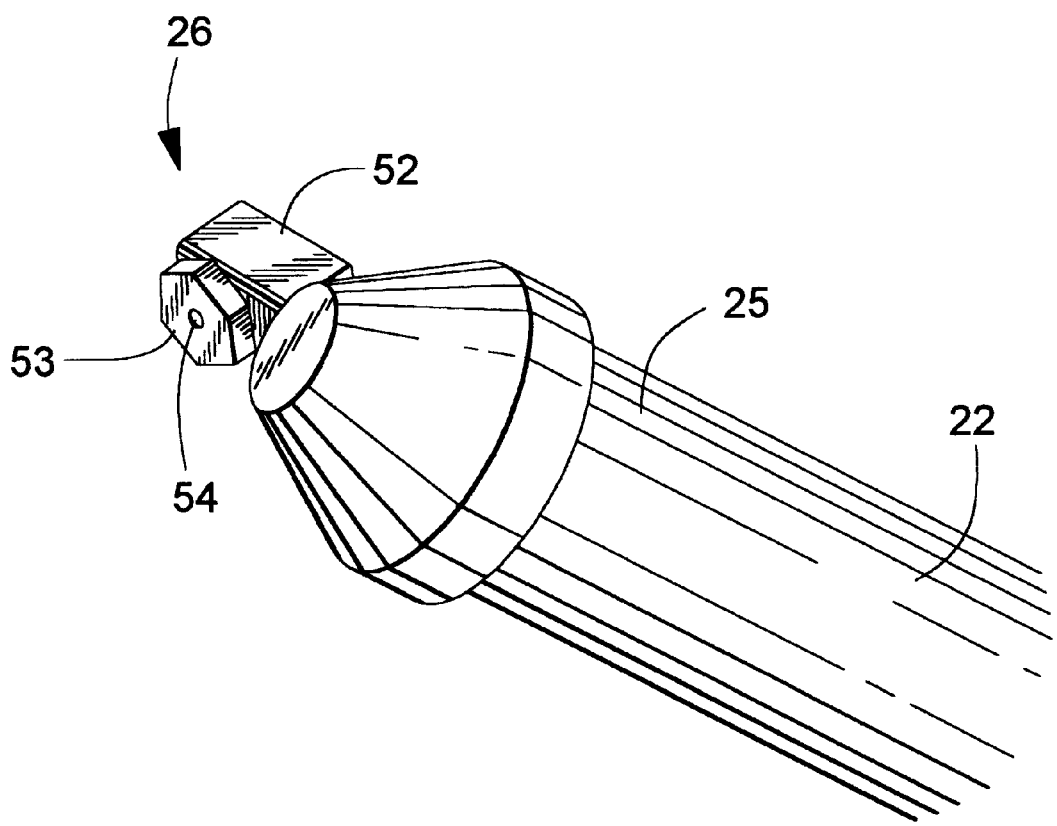
FIG. 6 is a partially sectioned detail of a fluid injection spray system for a wind machine, according to an embodiment of the invention.
Figure 7:
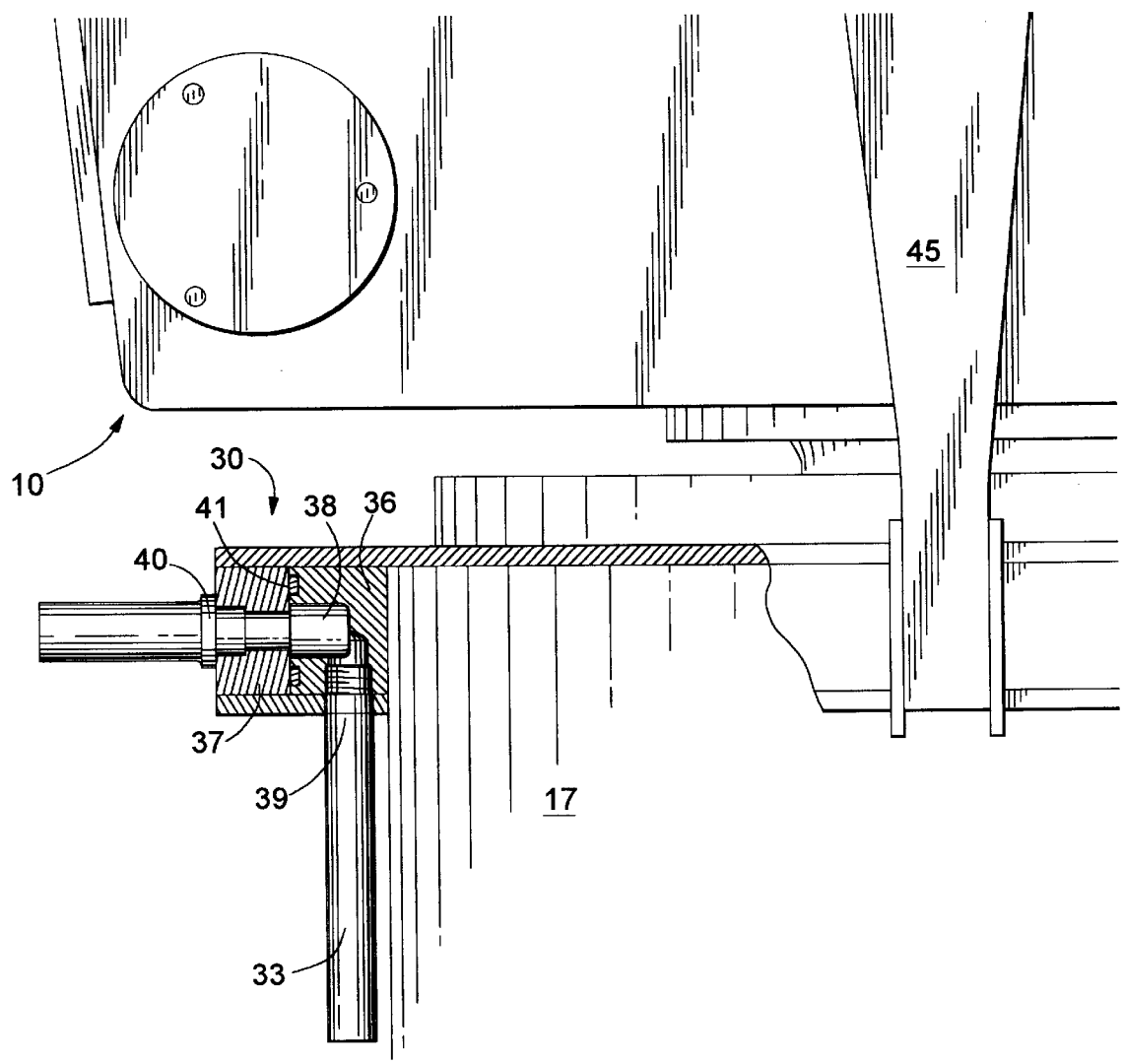
FIG. 7 is a sectioned detail of a fluid injection spray system for a wind machine, according to an embodiment of the invention.

FIG. 6 also details a nozzle end 25 of the nozzle wand 22 and shows the nozzle 26 as including a nozzle body 52 and an orifice plate 53. The nozzle body mounts to the nozzle end and receives the fluid, directing it through an orifice 54 in the orifice plate.

As shown in FIG. 1, the blades 16 of the propeller 15 are each connected to a hub 60. The hub is rotatable and turned by the action of the wind machine 10. As shown in FIG. 1, each propeller blade has a blade tip 61. Each propeller blade also has a blade length "L", measured from the propeller's hub to the blade tip. To introduce the fluid 11 effectively into the airstream 12, the nozzle wands must have a sufficient length to extend well into the air stream from their base end 24 attachment to the wind machine. Each of the nozzle wands 22 extends a distance from the wind machine approximately between 25% and 100% of the blade length from the hub. Most preferably, the nozzles are positioned at a point approximately 40% of the blade length from the hub.

The nozzle wands 22 each place their respective nozzles 26 downstream from the blades 16 of the wind machine 10, at points parallel along the airstream 12 from the proximate midpoint of the blade length L of the propeller blades. This midpoint, at the proximate half-length of the blade, essentially scribes a circle as the propeller 15 rotates about the hub 60. Projecting this circle downstream, or in the same direction as the airstream 12 travels from the propeller, a cylinder is constructed. Most preferably, the nozzles, at the nozzle ends 25 of each nozzle wand, are each located proximate the surface of this constructed cylinder.

Figure 4:
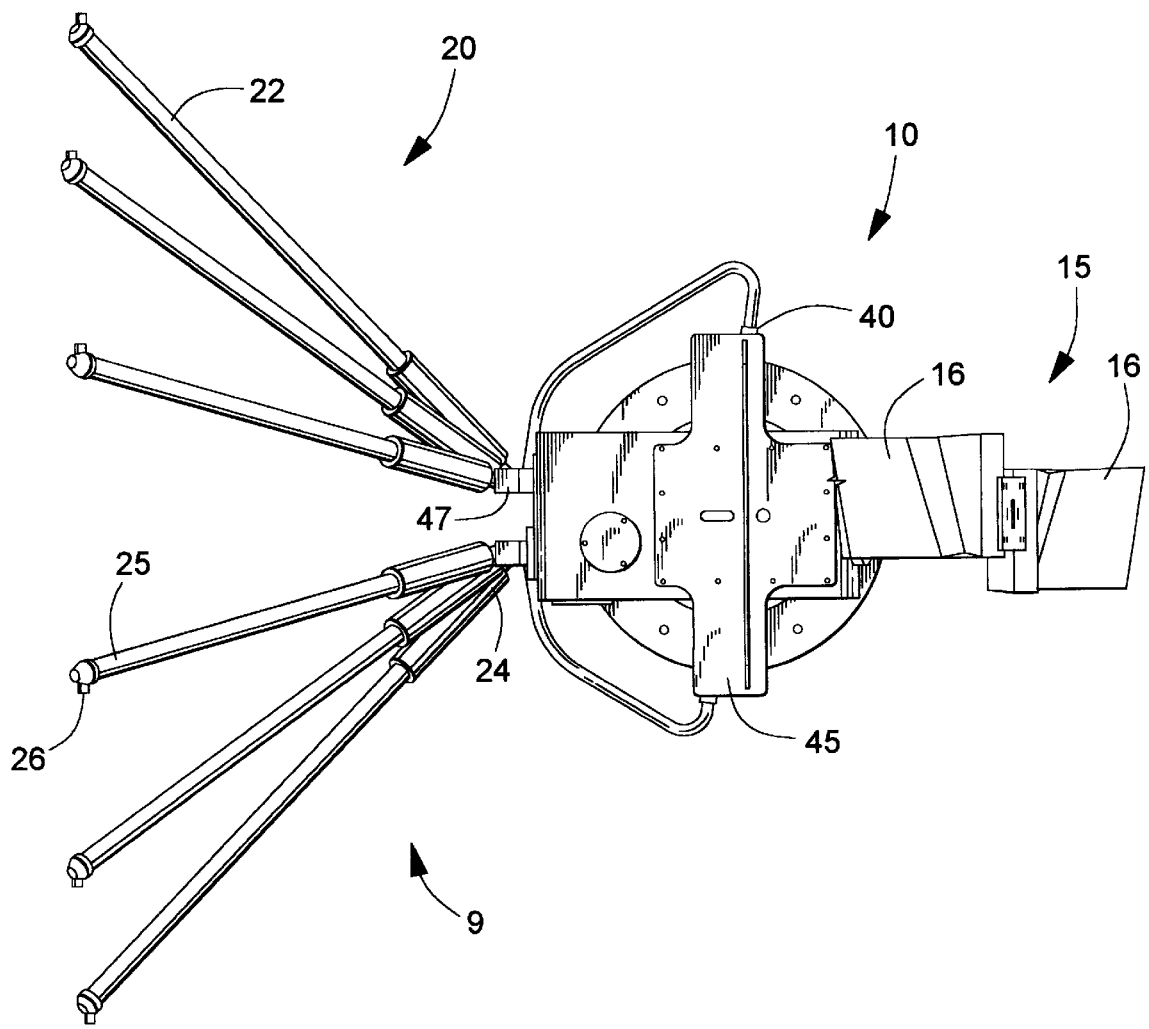
FIG. 4 is a top view of a fluid injection spray system for a wind machine, according to an embodiment of the invention.
Figure 5:
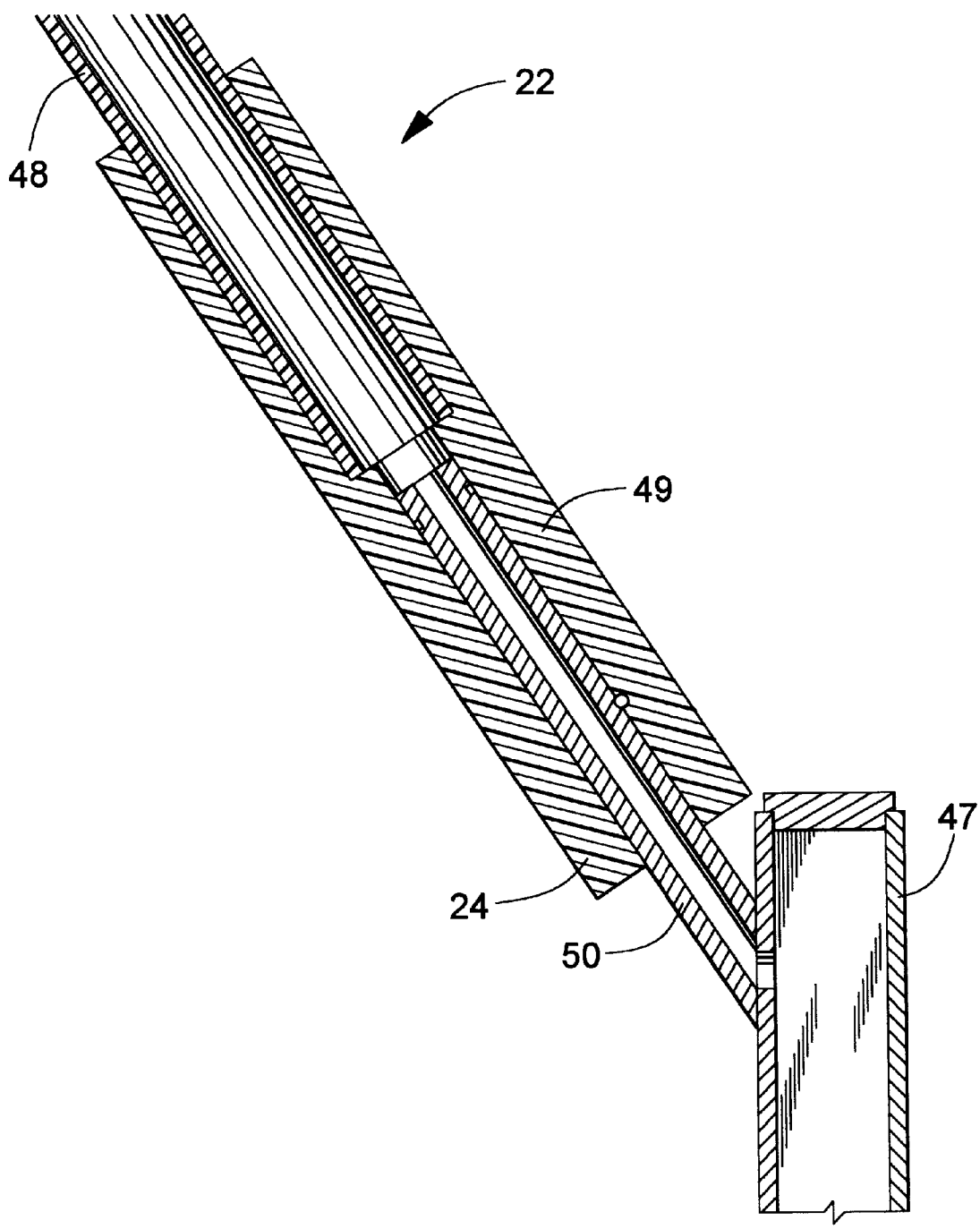
FIG. 5 is a nozzle detail of a fluid injection spray system for a wind machine, according to an embodiment of the invention.

Additionally, the nozzles 26 are each positioned by the nozzle wands 22 at a downstream distance that is sufficient to avoid some turbulence from the propeller 15. The inventor of the present invention has found that the laminar characteristics of the airstream 12 increases at a relatively short distance from the propeller. For the best dispersion and coverage into airstream by the injected fluid, this propeller turbulence would be ideally at a minimum surrounding the nozzles. To take advantage of this relatively laminar downstream flow regime, the wands also extend away from the rear of the wind machine 10, as shown in FIGS. 1 and 4.

The fluid 11 carried by the air stream 12 can be directed toward a variety of general or specific targets. These targets can include orchards, vineyards, crops or any other areas that require the environmental modifications of a type that can be provided by the apparatus of the present invention. The injected fluid can perform cooling, humidifying, heating or a dispersal of an aerosol material. Such aerosol materials can include agricultural chemicals, ice melting compounds, dust abatements or fog nucleation particles.

As a preferred alternative, the present invention can be utilized for dust control. In such an embodiment, the target of the air stream 12 is a pile of material or a dust generating process. The fluid 11 injected by the nozzles can be water, or alternatively, an amended water solution that includes a surfactant for coating a powdery target material or a binding agent for forming a crust on the surface of the powdery material.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

What is claimed is:

1. A fluid injection apparatus for a wind machine comprising:

a wind machine for generating an air stream, the wind machine rotatably mounted upon a central tower;

a nozzle array for injecting a fluid into the air stream, the nozzle array mounted to the wind machine; and a manifold mounted on the central tower, proximate the wind machine, the manifold having an inner ring and an outer ring, the inner ring fixedly mounted to the central tower, and the inner ring including a fluid inlet, the outer ring circumferentially mounted on the inner ring, the outer ring rotatable relative to the inner ring, and the outer ring including a fluid outlet, the manifold for receiving the fluid through the fluid inlet and distributing the fluid to the nozzle array through the fluid outlet.

2. The apparatus of claim 1, wherein the outer ring of the manifold is cooperatively rotational to the wind machine with respect to the central tower.

3. The apparatus of claim 2, wherein the wind machine includes a ring bracket; and the ring bracket mounted to the outer ring of the manifold and mounted to the wind machine, the ring bracket for maintaining the outer ring in a synchronous position with respect to the wind machine.

4. The apparatus of claim 1, wherein the fluid outlet on the outer ring is a plurality of fluid outlets.

5. The apparatus of claim 1, wherein the nozzle array includes a plurality of nozzles.

6. The apparatus of claim 1, wherein the nozzle array includes a multiple of nozzle wands, each of the nozzle wands having a base end and a nozzle end, each base end attached proximate the wind machine and each nozzle end having a nozzle.

7. The apparatus of claim 6, wherein each nozzle wand include a substantially stiff lower wand and a relatively flexible upper wand, to provide a substantial flexibility to the nozzle wand.

8. The apparatus of claim 7, wherein the wind machine has a propeller blade connected to a rotatable propeller hub, the propeller blade having a blade tip and the propeller blade having a blade length measured from the propeller hub to the blade tip, and each of the plurality of the nozzle wands extends a distance from the wind machine approximately between 25% and 100% of the blade length and one full blade length, from the propeller hub.

9. The apparatus of claim 8, wherein each of the plurality of the nozzle wands extends a distance from the wind machine approximately 40% of the blade length from the propeller hub.

10. The apparatus of claim 9, wherein the base end of the nozzle wand receives the fluid from a sub-manifold, and the sub-manifold connects to the fluid outlet of the outer ring of the manifold.

11. A fluid injection apparatus for a wind machine comprising:

a wind machine mounted upon a central tower, the central tower rotatable about a vertical axis, the wind machine for generating an air stream, the wind machine having a propeller, and the propeller including a propeller blade connected to a rotatable propeller hub;

a nozzle array mounted to the wind machine, the nozzle array for injecting a fluid into the air stream;

the nozzle array not attached to the propeller, and the nozzle array not co-rotatable with the propeller; and the nozzle array having a plurality of nozzles, and a nozzle of the nozzle array positioned to inject the fluid into the airstream at a location in the airstream above the propeller hub.

12. The apparatus of claim 11, wherein the nozzle array has a plurality of nozzle wands, each of the nozzle wands having a base end and a nozzle end, each base end attached proximately to the wind machine, and each nozzle end having a nozzle.

13. The apparatus of claim 12, wherein the propeller blade includes a blade tip and the propeller blade has a blade length measured from the propeller hub to the blade tip, and each of the plurality of nozzle wands extends a distance from the wind machine approximately between 25% and 100% of the blade length from the propeller hub.

14. The apparatus of claim 13, wherein each of the plurality of the nozzle wands extends a distance from the wind machine approximately 40% of the blade length from the propeller hub.

15. The apparatus of claim 12, wherein each of the plurality of the nozzle wands conducts the fluid from a manifold to the nozzle at the nozzle end of the nozzle wands.

16. A fluid injection apparatus for a wind machine comprising:

a wind machine mounted upon a central tower, the central tower rotatable about a vertical axis, and the wind machine for generating an air stream;

the wind machine having a propeller, the propeller including a propeller blade connected to a rotatable propeller hub; and a nozzle array mounted to the wind machine, the nozzle array for injecting a fluid into the air stream, the nozzle array not attached to the propeller, the nozzle array not co-rotatable with the propeller, and the nozzle array rotatable about the vertical axis of the central tower.

17. The apparatus of claim 16, wherein the nozzle array has a plurality of nozzle wands, each of the nozzle wands having a base end and a nozzle end, each base end attached proximately to the wind machine, and each nozzle end having a nozzle.

18. The apparatus of claim 17, wherein the wind machine has a propeller blade connected to a rotatable propeller hub, the propeller blade having a blade tip and the propeller blade having a blade length measured from the propeller hub to the blade tip, and each of the plurality of nozzle wands extends a distance from the wind machine approximately between 25% and 100% of the blade length from the propeller hub.

19. The apparatus of claim 18, wherein each of the plurality of the nozzle wands extends a distance from the wind machine approximately 40% of the blade length from the propeller hub.

20. The apparatus of claim 17, wherein each of the plurality of the nozzle wands conducts the fluid from a manifold to the nozzle at the nozzle end of the nozzle wands.

* * * * *